United States Patent
Dubourg et al.

(10) Patent No.: US 7,064,551 B2
(45) Date of Patent: Jun. 20, 2006

(54) PROCESS FOR DETERMINING THE RESISTIVITY OF A FORMATION THROUGH WHICH A WELL EQUIPPED WITH A CASING PASSES

(75) Inventors: Isabelle Dubourg, Chilly-Mazarin (FR); Ollivier Faivre, Paris (FR); Gilles Rouault, Boulogne (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 69 days.

(21) Appl. No.: 10/511,611

(22) PCT Filed: Apr. 10, 2003

(86) PCT No.: PCT/EP03/20100

§ 371 (c)(1),
(2), (4) Date: Oct. 15, 2004

(87) PCT Pub. No.: WO03/087882

PCT Pub. Date: Oct. 23, 2003

(65) Prior Publication Data

US 2005/0253588 A1    Nov. 17, 2005

(30) Foreign Application Priority Data

Apr. 17, 2002    (FR) .................................. 02 04803

(51) Int. Cl.
*G01V 3/20* (2006.01)
(52) U.S. Cl. ...................... 324/368; 324/358
(58) Field of Classification Search ........ 324/347–373, 324/375; 166/250.01
See application file for complete search history.

(56) References Cited

U.S. PATENT DOCUMENTS 4,820,989 A    4/1989  Vail, III
5,642,051 A *  6/1997  Babour et al. .............. 324/357
6,987,386 B1 * 1/2006  Vail, III ....................... 327/368
2001/0026156 A1  10/2001  Olivier et al.

FOREIGN PATENT DOCUMENTS

GB         2360849        10/2001

OTHER PUBLICATIONS

Aulia et al., Resistivity Behind Casing, Oilfield Review, pp. 2-25.*

* cited by examiner

Primary Examiner—Jay M. Patidar
(74) Attorney, Agent, or Firm—Victor H. Segura; Brigitte L. Echols

(57) ABSTRACT

Process for determining the resistivity (Rt) of a formation (9) surrounding a well (10) equipped with a casing (11) consisting of several casing segments (11.*i*, 11.*s*) with an overlapping part (1), and cement (3) in the overlapping part (1),
in which a current is injected into the casing (11) to cause a leakage current (Ifor) into a area (8) of the formation (9) offset from the overlapping part (1), the leakage current (Ifor) in the measurement area (8) is determined and is used to deduce the measured resistivity (Rm) of the formation,
a current is injected into the casing (11) to cause a current leakage (Icem) in the cement (3) of the overlapping part (1), the leakage current (Icem) in the cement (3) in the overlapping part (1) is determined, and is used to deduce the measured resistivity (Rcem) of the cement (3),
the measured resistivity (Rm) of the formation (9) is corrected using a factor to take account of the measured resistivity (Rcem) of the cement (3) to obtain the resistivity (Rt) of the formation (9).

Application particularly to oil exploration.

14 Claims, 6 Drawing Sheets

PROCESS FOR DETERMINING THE RESISTIVITY OF A FORMATION THROUGH WHICH A WELL EQUIPPED WITH A CASING PASSES

TECHNICAL FIELD

This invention relates to a process for determining the resistivity of a geological formation through which a well equipped with an electrically conducting casing passes.

The importance of resistivity diagraphs for oil exploration is now universally accepted. It is known that the resistivity of a geological formation depends essentially on the fluid contained in it. This type of resistivity measurement is frequently made on formations passed through to decide whether or not to put an oil well into operation, so that its saturation in fluid (mainly brine or fresh water, or hydrocarbons including crude oil and gas, or a mixture of one or several of these fluids). A formation containing brine has a much lower resistivity than a formation containing hydrocarbons.

STATE OF PRIOR ART

Measurements using prior art are made using systems provided with electrodes to measure currents or voltages.

Resistivity diagraphs in open holes have been made for several decades.

We are now beginning to make resistivity measurements in wells reaching hydrocarbon reservoirs in operation and these wells are equipped with a casing. These measurements are used to determine the location of water-hydrocarbon interfaces and to monitor the change in level of these interfaces with time in order to monitor the behavior of the hydrocarbon reservoir and optimize its operation.

Resistivity measurements can also be made in wells in which no measurements were made before the casing was installed, particularly to increase knowledge about the hydrocarbon reservoir, and possibly to detect production layers that were not identified initially.

These resistivity measurements in wells equipped with a casing are not easy to make since the resistivity of the casing (of the order of $2 \times 10^{-7}$ $\Omega$.m for a steel casing) is very small compared with the resistivity of the formation (between about 1 and $10^3$ $\Omega$.m) and the casing forms a barrier to the transfer of current into the formation around the well beyond the casing.

The measurement principle consists of circulating an electric current along the casing under conditions such that a leak or current loss occurs towards the formation. This leak depends on the resistivity of the formation, and is greater when the formation has a high conductivity. It can be evaluated by making measurements of the voltage drop between electrodes placed at different levels in the well. These voltage drops are of the order of a few nanovolts.

This type of measurement principle is described in a large number of patents and particularly in French patent applications FR-A1-2 793 031 and FR-A1-2 793 032 issued by the applicant.

Refer to FIG. 1 that shows a section of a well 10 with centerline XX', equipped with a metallic casing 11, in a formation 9. The level at which the measurement will be made is marked b. We consider a section a–c of casing 11 extending on each side of level b. A current is circulated in the casing 11 with a return remote from level b, for example at the surface. There is a current leakage Ifor in formation 9 and in terms of the electrical circuit, this current leakage is equivalent to the current passing through a shunt resistance Rt located between level b and infinity. The value of this shunt resistance Rt is representative of the resistivity (also called Rt) of the formation at level b. Thus according to Ohm's law, we can write:

$$Rt = K(V_b,\infty / Ifor)$$

K is a geometric constant that may be determined particularly by calibration, by moving into an impermeable area of the formation 9 in which the resistivity is already known through measurements made in the open hole before the well is put into operation.

$V_b,\infty$ is the potential at level b with reference to a point at infinity. It is measured using a measurement electrode eb placed at level b in electrical contact with the inside of casing 11 and a reference electrode (not shown) that may be placed on the surface.

Ifor is the leakage current in the formation 9 at level b, and may for example be determined using the method described in patent application FR-A1-2 793 031.

This method comprises three steps. In a first step, a current is injected into the casing 11 at a point In1 at a longitudinal distance along the formation 9 so as to cause a current leakage, and electrodes ea, eb and ec placed at levels a, b and c respectively are used to measure the potential drops along casing sections a–b and b–c respectively. In a second step, a current is injected into the casing 11 at point In2 at a longitudinal distance along the formation 9 located on the side opposite the first point In1 to create a current leakage in the formation 9. Electrodes ea, eb and ec are used to measure the potential drops along casing sections a–b and b–c respectively. In a third step, the corresponding measurements in the previous two steps are combined in order to obtain voltage values corresponding to a circuit formed by the casing between the two injection points In1, In2 without any current leakage to the formation. The leakage current Ifor in the formation 9 is determined from the first step or the second step, with the values resulting from the combination.

In one preferred variant, the first injection point In1 is located above level a, the second injection point In2 is located below level c and the combination is a subtraction of the measurements in the second step from the measurements in the first step.

There is another non-negligible barrier to sending current in the formation. This is the cement 3 that is poured into the well 10 to hold the casing 11 in position. It fills in the inevitable space between the formation 9 and the casing 11. This cement 3 is equivalent to the resistance in series with the shunt resistance Rt due to the formation 9.

The resistivity of cement can be known by laboratory measurements. The resistivity of fresh cement is typically within a range between 1 and 10 $\Omega$.m. Once in place, the cement 3 is no longer directly accessible since it is behind the casing 11.

Furthermore, its resistivity varies firstly with time and secondly with the medium in which it is located. Resistivity measurements in the well equipped with a casing 10 may be made over several years or decades after the cement has been placed, and it is not known what has happened to the cement during this time.

The porosity of the cement is of the order of 35% and when it is in place, there is an ion exchange between the water contained in the cement and the water contained in the formation.

French patent FR-A1-2 807 167 application issued by the applicant disclosed a process to determine the resistivity of a formation through which the well equipped with a casing passes, taking account of the effect of the cement. The authors found that the measured value of the resistivity of the formation could be corrected taking account of the thickness of the cement and its resistivity to obtain the "genuine" resistivity. "Genuine" resistivity means a value of the resistivity that is as close as possible to the real value of the resistivity that is unknown and that is required.

Correction nomograms are used to find a correction factor for different thicknesses of the cement layer, equal to the ratio between the required resistivity and the resistivity measured for the formation at the measurement area, and this factor takes account of the ratio between the measured resistivity of the formation and the resistivity of cement.

These nomograms are produced from mathematical models.

The thickness of the cement layer may be evaluated with acceptable precision if the outside diameter of the casing 11 and the inside diameter of the well 10 before casing are known.

The resistivity of the cement is not known, and the estimate used to make it is far from reality. The use of nomograms is not particularly efficient for correcting the value of the measured resistivity of the formation to obtain the value of the resistivity of the formation. The result is an approximate value with mediocre precision.

DESCRIPTION OF THE INVENTION

This invention is intended to improve the precision of the correction by proposing a method to give a more precise value of the resistivity of the formation using nomograms, a value of the measured resistivity of the formation and a value of the resistivity of the cement obtained from measurements.

In order to achieve this, this invention consists of a process for determining the resistivity of a geological formation surrounding a well equipped with a casing consisting of several casing segments following each other, in which two successive casing segments have an overlapping part, and the cement located between the casing and the formation and in the overlapping part between two adjacent casing segments, in which a current is injected into the casing to cause a leakage current into an area of the formation for which measurements are required, offset from the overlapping part, the leakage current in the measurement area is determined and is used to deduce the measured resistivity of the formation in the measurement area, a current is injected into the casing to cause a current leakage in the cement of the overlapping part, the leakage current in the cement in the overlapping part is determined and is used to deduce the measured resistivity of the cement, the measured resistivity of the formation is corrected using a factor to take account of the measured resistivity of the cement to obtain the resistivity of the formation.

The correction factor is equal to the ratio between the resistivity and the measured resistivity of the formation as a function of the ratio between the measured resistivity of the formation and the measured resistivity of the cement, for a given cement thickness within the area being measured in the formation.

The correction factor may be given in nomograms starting from the measured resistivity of the formation and the measured resistivity of cement.

The measured resistivity of the formation can be deduced from the leakage current in the measurement area and the casing potential in the measurement area with respect to a reference at infinity.

The measured resistivity of the cement can be deduced from the leakage current in the cement in the overlapping part and the casing potential in the overlapping part with respect to a reference at infinity.

The current injected into the casing to cause the leakage current in the cement in the overlapping part is such that it does not cause any leakage current in the formation behind the overlapping part.

The leakage current in the measurement area and the leakage current in the cement may be determined using a probe provided with measurement electrodes in contact with the casing, this probe being moved in the well to move to the measurement area and to the level of the overlapping part, respectively.

Current may be injected into the casing using the probe that is equipped with at least one current injector.

BRIEF DESCRIPTION OF THE DRAWINGS

This invention will be better understood after reading the description of example embodiments given for information only and that are in no way restrictive, with reference to the attached drawings on which.

Identical elements on these figures are marked with the same reference marks.

DETAILED DESCRIPTION OF PARTICULAR EMBODIMENTS

Figure 1:
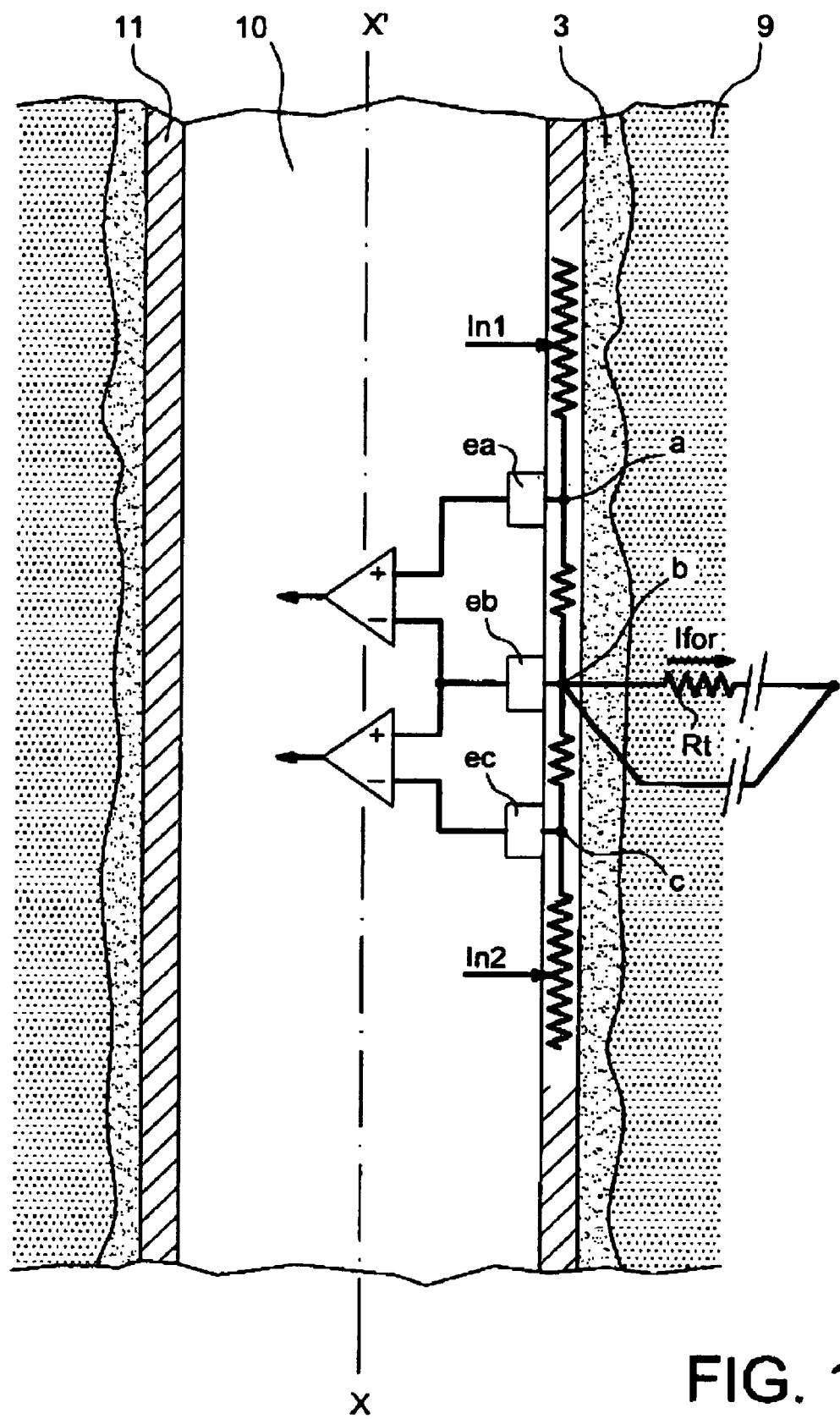
FIG. 1, already described, shows the resistivity measurement principle in a well equipped with a casing FIGS. 2A and 2B diagrammatically show a device for embodiment of the process according to the invention in two different measurement positions.
Figure 2A:
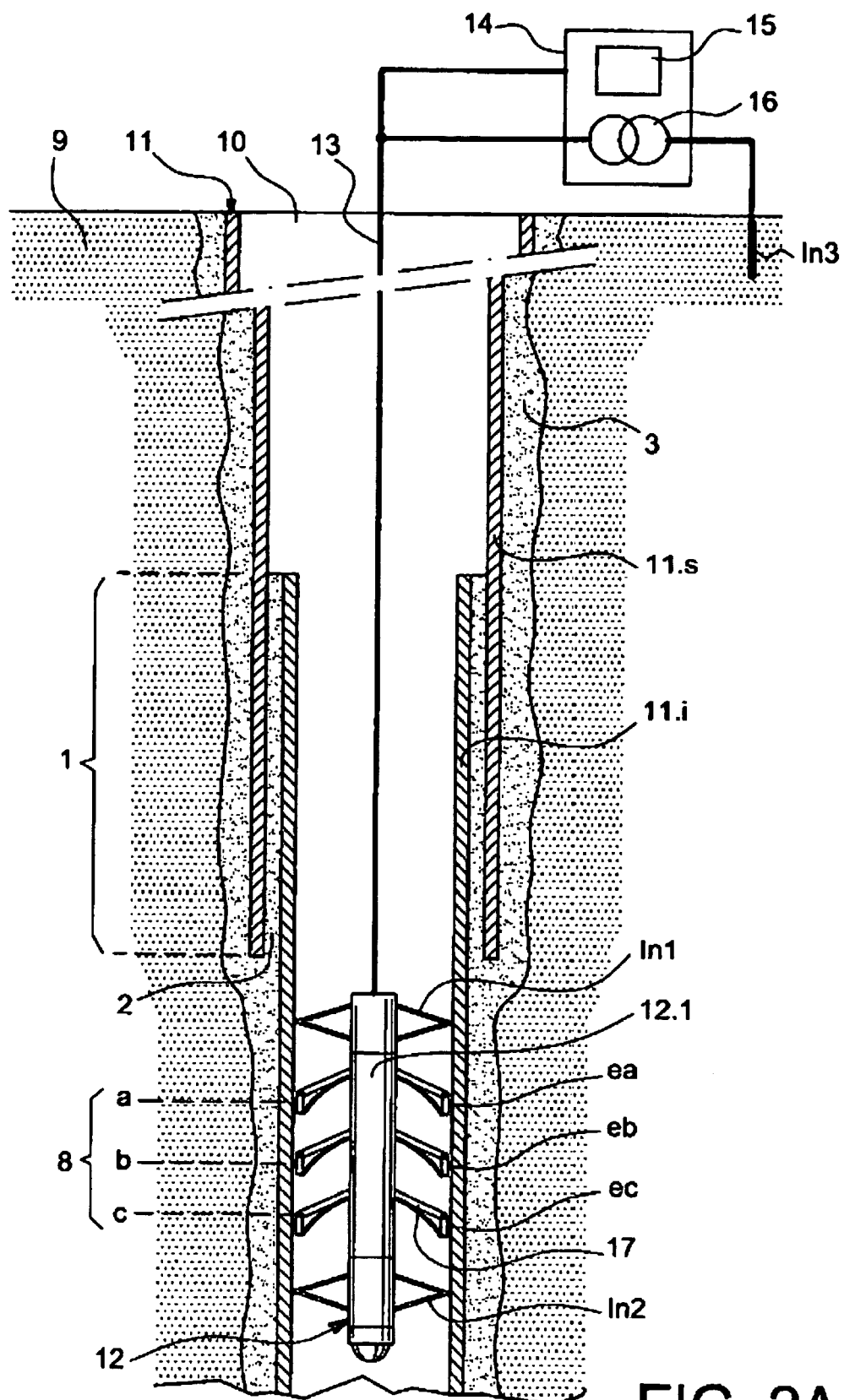
Figure 2B:
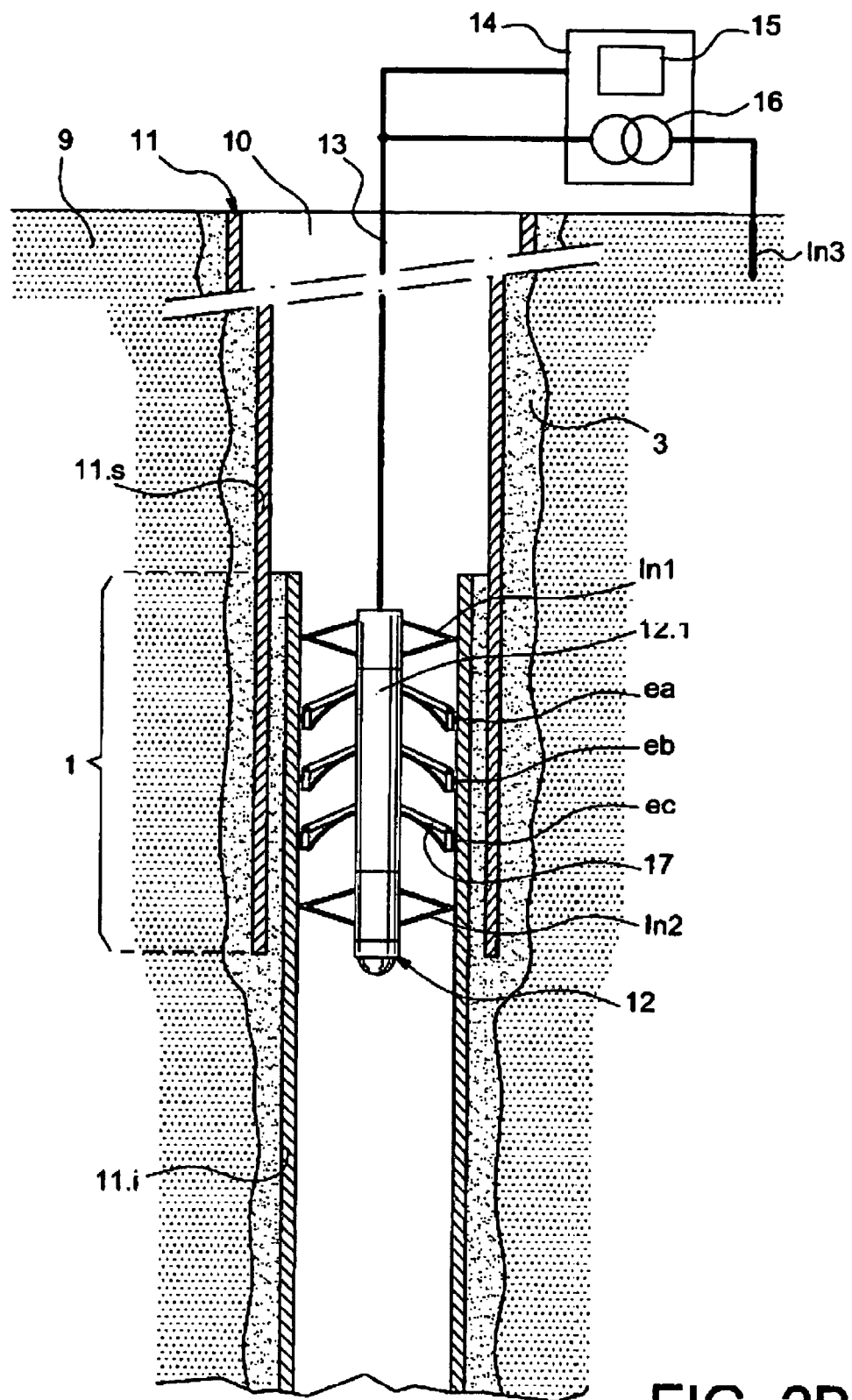

We will now refer to FIGS. 2A and 2B that show an example of a device for implementation of the process according to the invention, in two different positions. The device may be comparable to the device described in French patent application FR-A1-2 793 031 mentioned above.

The device shown comprises a probe 12 that can be displaced in a well 10 formed in a geological formation 9 and equipped with an electric conducting casing 11.

The casing 11 is formed from several casing segments, usually made of steel. Only two of these casing segments have been referenced to avoid making the figures too complicated, one is called the upper segment 11.*s* and the other is called the lower segment 11.*i*. These casing segments do not all have the same diameter, and they are coaxial when they are in position. These casing segments are lowered into the well 10 one after the other, from the thinnest to the thickest, and including an overlapping part 1 between two casing segments 11.*s* and 11.*i*. The two successive casing segments 11.*s*, 11.*i* do not have the same diameter, therefore there is a space 2 between the outside diameter of the lower casing segment 11.*i* and the inside diameter of the upper casing segment 11.*s*. The casing 11 is cemented to hold it in position in the well 10. The cement 3 is poured between the outside of the casing segments and the formation in which the well 10 is bored. The cement 3 also enters the space 2.

The probe 12 is connected by an electrical cable 13 to equipment 14 located on the surface. This equipment 14 may comprise means of acquisition and processing of data 15 supplied by the probe 12 and electrical power supply means 16.

The probe 12 comprises a body 12.1 and a group of at least three measurement electrodes ea, eb and ec that can come into contact with casing 11 by delimiting casing sections a–b, b–c. For example, the length of these segments may be between 40 and 80 centimeters. Electrodes ea, eb, and ec may be installed at the ends of the articulated arm 17 that connect them to body 12.1. These arms 17 are known in themselves, they are extended to come into contact with electrodes ea, eb and ec in contact with casing 11 when it is required to make measurements, and they are retracted when the measurements are terminated. When they are extended, these arms make good electrical contact between the electrode fitted on them and the casing 11, and when they are retracted they can move the probe without friction inside the casing 11. The probe 12 also contains two current injectors In1 and In2 on each side of the group of measurement electrodes ea, eb, and ec.

Insulating connectors 18 are placed on each side around the body 12.1 of the probe 12 between the current injectors In1, In2 and the measurement electrodes ea, eb, and ec to electrically isolate the measurement electrodes ea, eb, and ec from the current injectors In1, In2. The space between a current injector In1, In2 and the measurement electrode ea, ec closest to it may be of the same order of magnitude as the space between two successive measurement electrodes.

The current injectors In1, In2 may be made as described in the patent application FR-A1-2 739 031. They are also placed on the articulated arms.

The device also comprises a current return electrode In3, remote from the injectors. It may be located on the surface at the same level as the cased wellhead 10 if the well is sufficiently deep, or it may be on the surface but remote from the cased wellhead. The current injectors In1, In2 and the current return electrode In3 are powered with electricity, and they are connected to the electrical power supply means that comprise the above mentioned electrical power supply source 16 on the surface and, depending on the case, a supplementary source (not shown) located in the probe 12 and appropriate switching circuits to change from one to the other.

On FIG. 2A, the probe 12 is in a position in which it can determine the resistivity of the formation that is located in a measurement area 8 at the group of measurement electrodes ea, eb, ec. These measurement electrodes ea, eb, ec are in contact with the lower casing segment 11.i, and they are remote from the overlapping part 1.

In this position of the probe 12, electrical current is circulated in casing 11 using at least one injector In1, In2 and the potentials are measured using measurement electrodes to determine the leakage current Ifor in the formation 9 in the measurement area 8, for example using the process described in the patent application FR-A1-2 739 031. This leakage current Ifor represents the resistivity of the formation in the measurement area. All that is necessary to obtain the measured resistivity Rm of the formation in the measurement area 8 is to determine the casing potential 11 in the measurement area with respect to a reference at infinity. This can be done as described in patent application FR-A1-2 739 031 using electrode eb and a reference electrode (not shown), for example placed on the surface at a distance from the current return electrode In3 or in the well.

The probe 12 is moved into a second position, the measurement electrodes ea, eb, ec are then at the overlapping part 1.

In general, the measurement area 8 is located more deeply in the formation than the overlapping part 1. Obviously, it would be possible to do the inverse.

The leakage current Icem in the cement 3 in space 2 is determined by circulating current in the casing 11 using at least one current injector of the probe 12 and measuring the potentials using the measurement electrodes ea, eb and ec, this current representing the resistivity of the cement. As before, the measured resistivity Rcem of the cement 3 can then be obtained by determining the potential of the casing 11 in the overlapping part 1 with respect to a reference at infinity. The measured resistivity of the cement Rcem can then be deduced from this value.

Figure 3:
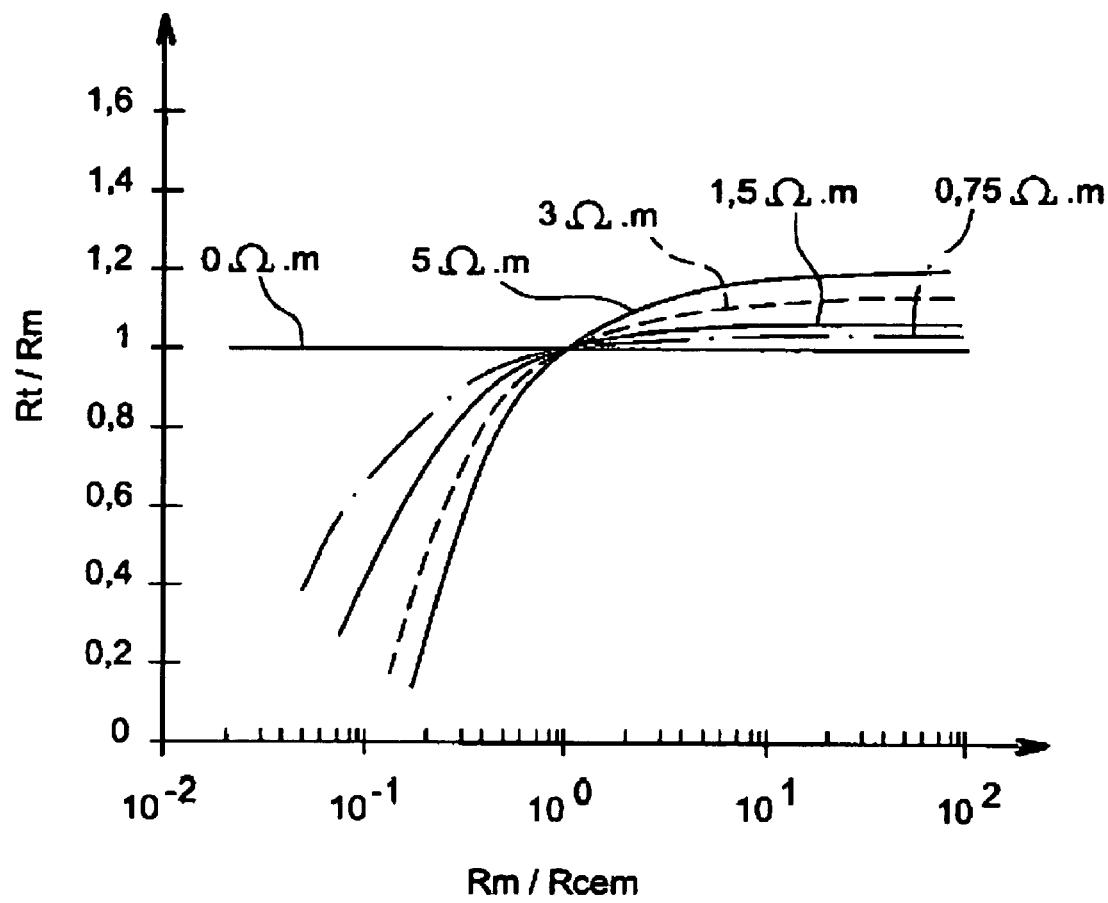
FIG. 3 is an example of correction nomograms used to correct the measured resistivity value of the formation.

Correction nomograms like those illustrated in FIG. 3 and those presented in patent application FR-A1-2 807 167 can then be used, to give a value of the correction factor to be applied to the measured resistivity Rm of the formation to obtain a precise value of the required resistivity Rt. his factor is obtained starting from the cement thickness and the ratio between the measured resistivity Rm of the formation in the measurement area 8 and the measured resistivity of the cement Rcem.

In prior art, the resistivity of the cement was simply estimated and not measured, and there can be a large difference between the two values. Consequently, the correction was no longer valid for obtaining a value of the required resistivity as close as possible to the real value.

The precision of the value of the resistivity of the formation obtained with this type of process is significantly improved.

On FIG. 3, the thickness of the cement 3 in the measurement area 8 varies between 0 and 5 inches (about 12 centimeters).

This correction should be made when the ratio between the resistivity of the formation Rt and the resistivity of the cement Rcem is less than 1 or when the cement layer is thick, more than about 1.5 inches (about 3.8 centimeters); in other cases the effect of cement can be neglected.

A series of simulations was carried out to demonstrate the influence of the cement on the leakage current in the formation compared with other parameters such as the resistivity of the formation, the diameters of casing segments, the length of the overlapping part. These simulations are illustrated in FIGS. 4A to 4D. These simulations were made on a modeled well very similar to that in FIGS. 2.

These simulations show the variations in the leakage current in the formation as a function of the depth between −8500 feet (about 2592 meters) and −9100 feet (about 2775 meters).

A current of 1 A was injected into the lower casing segment 11.i, and the resistivity of the cement 3 was varied between 0.5 and 20 $\Omega$.m and 20 $\Omega$.m, the current electrode In3 being located at the surface of the wellhead 10.

Figure 4A:
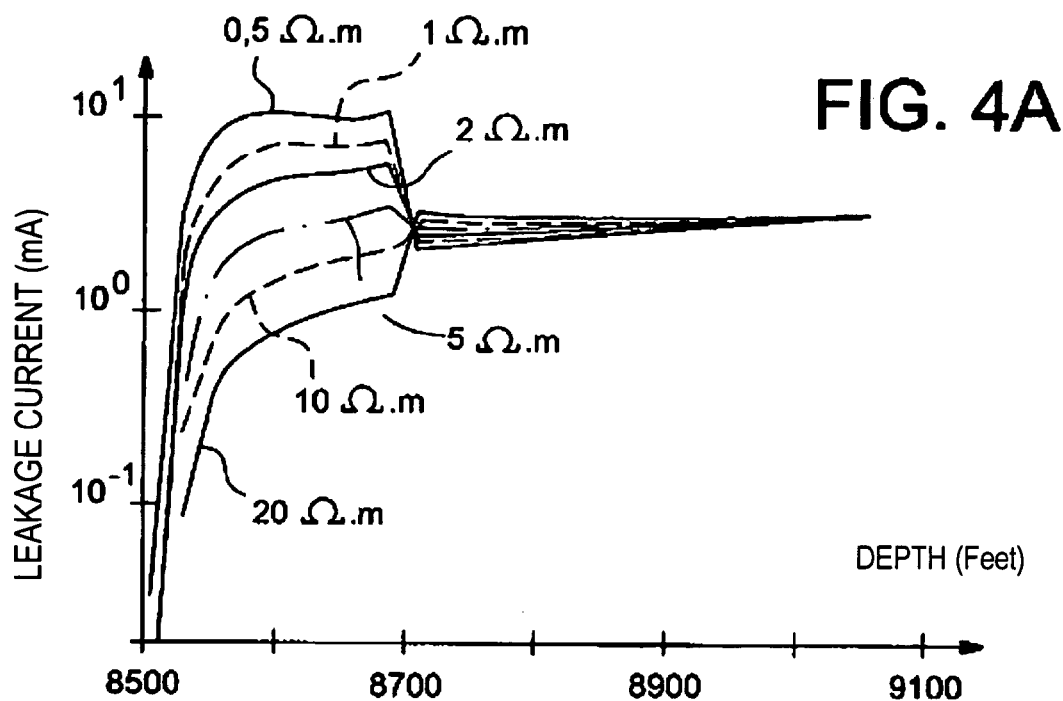
FIGS. 4A to 4D show simulations of the variation of the leakage current in the formation as a function of the depth, for various values of resistivity of the cement, and for several resistivities of the formation, several diameters of casing segments, and several lengths of the overlapping part.

In FIG. 4A, the length of the overlapping part is 200 feet (about 61 meters), between depth −8500 feet (about 2592 meters) and −8700 feet (about 2653 ). The lower casing segment 11.i has an outside diameter of 4.5 inches (about 11 centimeters) and the upper casing segment 11.s has an outside diameter of 7 inches (about 18 centimeters). The resistivity Rt of the formation is considered as being uniform and equal to 1 $\Omega$.m. In the overlapping part 1 in which there is a lot of cement, the current in the formation varies very significantly with the resistivity of the cement. These curves are considered as a reference.

Figure 4B:
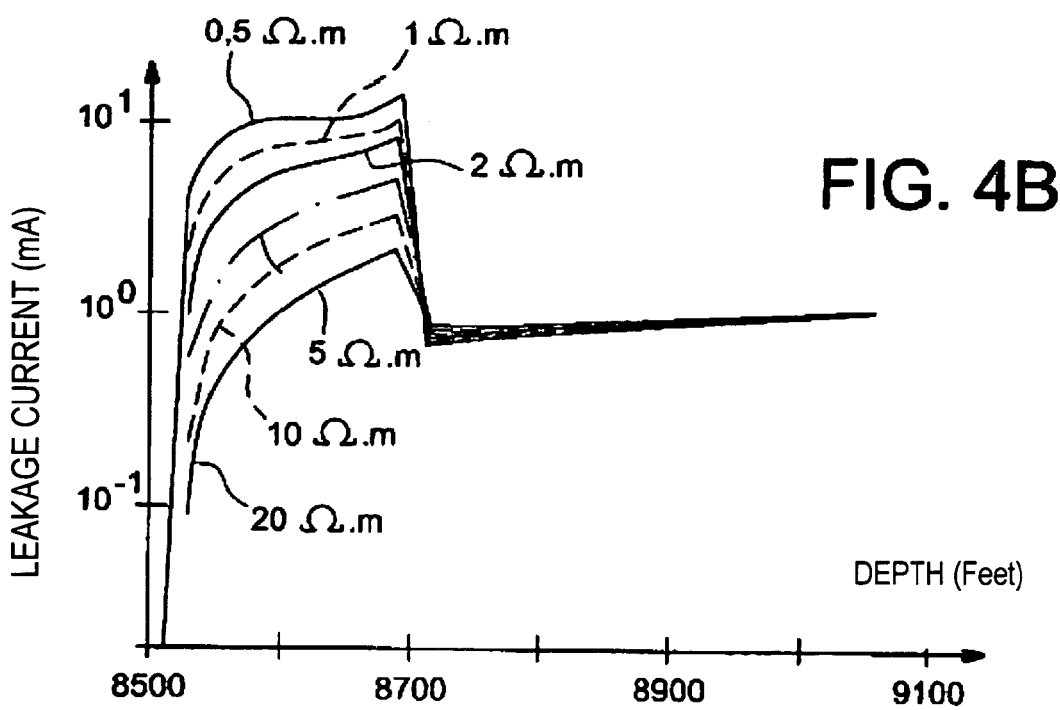

The conditions in FIG. 4B are the same as in FIG. 4A except for the resistivity of the formation that was increased from 1 Ω.m to 10 Ω.m. In the overlapping part, the current is almost the same as the current shown in FIG. 4A, which illustrates the small influence of the resistivity of the formation compared with the resistivity of the cement. Away from the overlapping part, the leakage current in the formation is lower since the resistivity of the formation has increased.

Figure 4C:
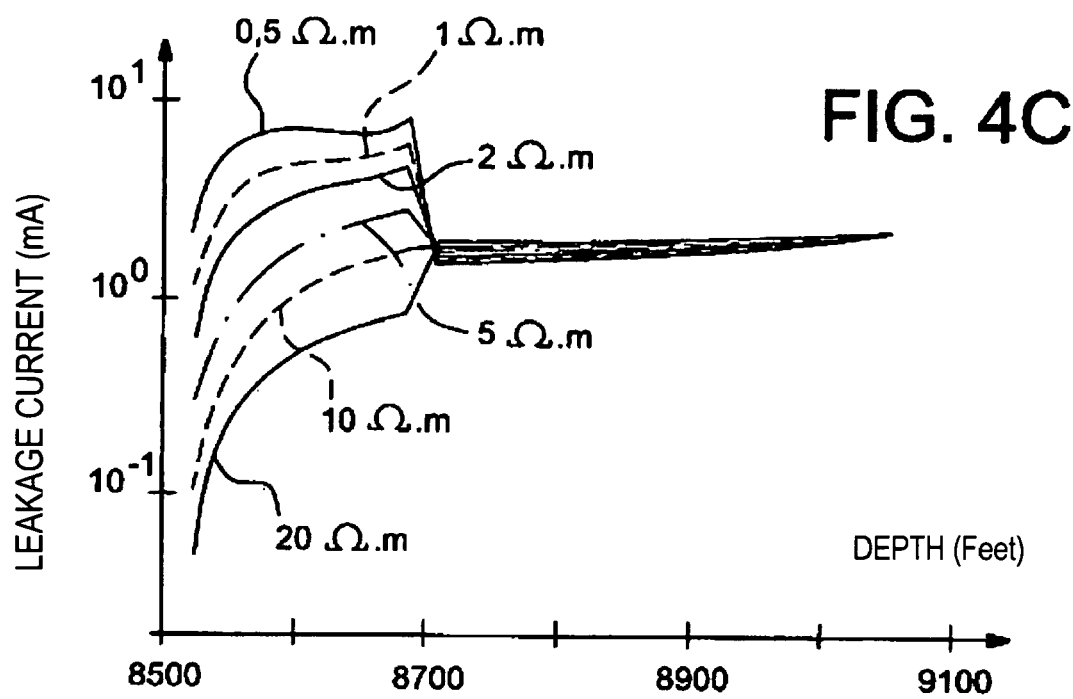

In FIG. 4C, the conditions are the same as in FIG. 4A except for the outside diameters of the segments of the casing that have changed from 4.5 to 7 inches, and from 7 inches to 9.625 inches (about 24 centimeters) respectively. The thickness of cement between the two segments of the casing 11.s, 11.i has not changed. The shape of the current curves is approximately the same as in FIG. 4A but the current amplitudes are slightly smaller. The dimensions of the casing segments have a small influence on the leakage current.

Figure 4D:
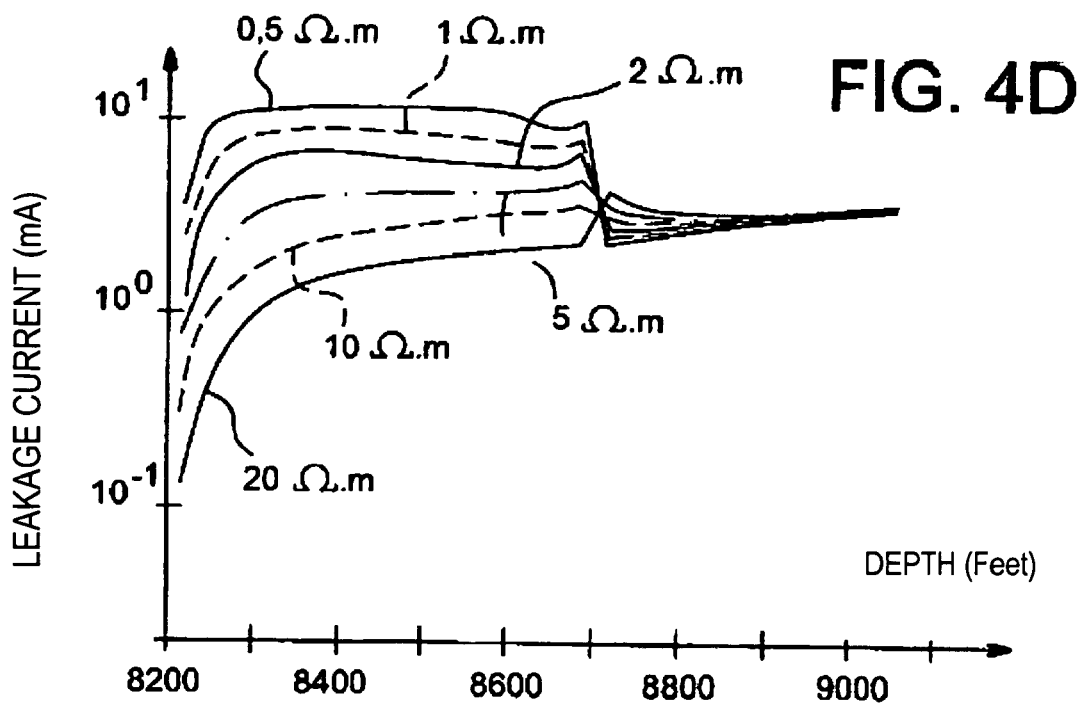

In FIG. 4D, the conditions are the same as in FIG. 4A except for the length of the overlapping part that has increased from 200 feet to 500 feet (about 152 meters) between −8200 feet (about 2500 meters) and −8700 feet. The leakage current remains globally higher for shallower depths. It can be deduced that it will become easier to determine the resistivity of the cement as the length of the overlapping part is increased. It can be seen that for an overlap of 500 feet, the curves contain a plateau which makes the measurement almost independent of the depth at which it was made.

These simulations show that the leakage current in the overlapping part is not very sensitive to the geometric configuration of the casing, and is much more sensitive to the resistivity of the cement. However, it is only very slightly influenced by the resistivity of the formation.

The invention claimed is:

1. Process for determining the resistivity (Rt) of a geological formation (9) surrounding a well (10) equipped with a casing (11) consisting of several casing segments (11.i, 11.s) following each other, in which two successive casing segments (11.i, 11.s) have an overlapping part (1), the cement (3) located between the casing (11) and the formation (9) and in the overlapping part (1) between two adjacent casing segments (11.i, 11.s),
   in which a current is injected into the casing (11) to cause a leakage current (Ifor) into an area (8) of the formation (9) for which measurements are required, offset from the overlapping part (1), the leakage current (Ifor) in the measurement area (8) is determined and is used to deduce the measured resistivity (Rm) of the formation in the measurement area (8),
   wherein a current is injected into the casing (11) to cause a current leakage (Icem) in the cement (3) of the overlapping part (1), the leakage current (Icem) in the cement (3) in the overlapping part (1) is determined, and is used to deduce the measured resistivity (Rcem) of the cement (3), and
   the measured resistivity (Rm) of the formation is corrected using a factor to take account of the measured resistivity (Rcem) of the cement (3) to obtain the resistivity (Rt) of the formation (9).

2. Process according to claim 1, wherein the correction factor for a given cement thickness (3) in the measurement area (8) of the formation (9) is equal to the ratio between the resistivity (Rt) and the measured resistivity (Rm) of the formation (9) as a function of the ratio between the measured resistivity (Rm) of the formation (9) and the measured resistivity (Rcem) of the cement (3).

3. Process according to claim 2, wherein the correction factor is given in nomograms starting from the measured resistivity (Rm) of the formation (9) and the measured resistivity (Rcem) of the cement (3).

4. Process according to claim 3, wherein the measured resistivity (Rm) of the formation is deduced from the leakage current (Ifor) in the measurement area (8) and the potential of the casing (11) in the measurement area (8) with respect to a reference at infinity.

5. Process according to claim 4, wherein the measured resistivity (Rcem) of the cement can be deduced from the leakage current (Icem) in the cement (3) in the overlapping part (1) and the potential in the casing (11) in the overlapping part (1) with respect to a reference at infinity.

6. Process according claim 5, wherein the current injected into the casing (11) to cause the leakage current (Icem) in the cement (3) in the overlapping part (1) is such that it does not cause any leakage current in the formation (9) behind the overlapping part (1).

7. Process according to claim 6, wherein the leakage current in the measurement area (8) and the leakage current in the cement (3) are determined using a probe (12) provided with measurement electrodes in contact with the casing (11), this probe (12) being moved in the well (10) to move to the measurement area (8) and to the level of the overlapping part (1), respectively.

8. Process according to claim 7, wherein the current is injected into the casing (11) using the probe (12) that is equipped with at least one current injector (In1, In2).

9. Process according to claim 1, wherein the correction factor is given in nomograms starting from the measured resistivity (Rm) of the formation (9) and the measured resistivity (Rcem) of the cement (3).

10. Process according to claim 1, wherein the measured resistivity (Rm) of the formation is deduced from the leakage current (Ifor) in the measurement area (8) and the potential of the casing (11) in the measurement area (8) with respect to a reference at infinity.

11. Process according to claim 1, wherein the measured resistivity (Rcem) of the cement can be deduced from the leakage current (Icem) in the cement (3) in the overlapping part (1) and the potential in the casing (11) in the overlapping part (1) with respect to a reference at infinity.

12. Process according claim 1, wherein the current injected into the casing (11) to cause the leakage current (Icem) in the cement (3) in the overlapping part (1) is such that it does not cause any leakage current in the formation (9) behind the overlapping part (1).

13. Process according to claim 1, wherein the leakage current in the measurement area (8) and the leakage current in the cement (3) are determined using a probe (12) provided with measurement electrodes in contact with the casing (11), this probe (12) being moved in the well (10) to move to the measurement area (8) and to the level of the overlapping part (1), respectively.

14. Process according to claim 13, wherein the current is injected into the casing (11) using the probe (12) that is equipped with at least one current injector (In1, In2).

* * * * *